June 28, 1932.  T. J. McCORMICK ET AL  1,865,031
TIRE COVER
Filed Jan. 30, 1931  2 Sheets-Sheet 1

INVENTORS
Thomas J. McCormick &
Robert E. Linn
Francis D. Hardesty
ATTORNEY

June 28, 1932.    T. J. McCORMICK ET AL    1,865,031
TIRE COVER
Filed Jan. 30, 1931    2 Sheets-Sheet 2

INVENTORS
Thomas J. McCormick &
Robert E. Linn
BY  Francis D. Hardesty
ATTORNEY

Patented June 28, 1932

1,865,031

UNITED STATES PATENT OFFICE

THOMAS J. McCORMICK AND ROBERT E. LINN, OF DETROIT, MICHIGAN; SAID LINN ASSIGNOR TO SAID McCORMICK

TIRE COVER

Application filed January 30, 1931. Serial No. 512,355.

This invention relates to tire covers and more particularly to covers equipped with means for enhancing and ornamenting their appearance.

In prior application, Ser. No. 492,966, November 3, 1930, there is disclosed a cover having a face portion, a tread portion, and a second face portion, the latter portions being less than 360 degrees in length, which cover is placed on a tire by pulling back the ends of the cut away face and tread portions and then allowing the ends to spring back after the cover is slid onto the tire.

It is upon this type of cover that the parts forming the present invention have been disclosed, but it is to be understood that other covers may be equipped with similar parts without departing from the scope of the invention.

An object of this invention is a cover having molding members generally of C shape in cross section and of stiff, smooth, metallic material, capable of being plated or polished as desired, which members enhance the appearance of the cover. It is preferred to mount these molding members at the lines of juncture between the face and the tread portions and it also is contemplated to utilize these molding members to protect edges of the cover.

A further object is a cover wherein the junctures between portions include a metallic molding member which encompasses adjacent edges of cover parts and clamps them to each other so as to form a stitchless seam at this point.

A still further object is a cover having molding members located as described above and wherein wide bands are formed integral with the molding members to enhance the appearance of the covers.

Other forms of covers may be constructed in accordance with the ideas outlined above and more particularly disclosed in the specification which follows and it is contemplated to claim as broadly as possible the combination of a cover with molding members such as are disclosed in the drawings.

Still further objects will readily occur to those skilled in the art upon reference to the following description and the accompanying drawings in which Fig. 1 shows a tire provided with a cover of the invention, a rear disc not being shown, the view being taken as if in the direction of the arrow 1 of Fig. 2.

Figs. 4 to 8 inclusive are similar views of modified forms of covers.

Figure 1:
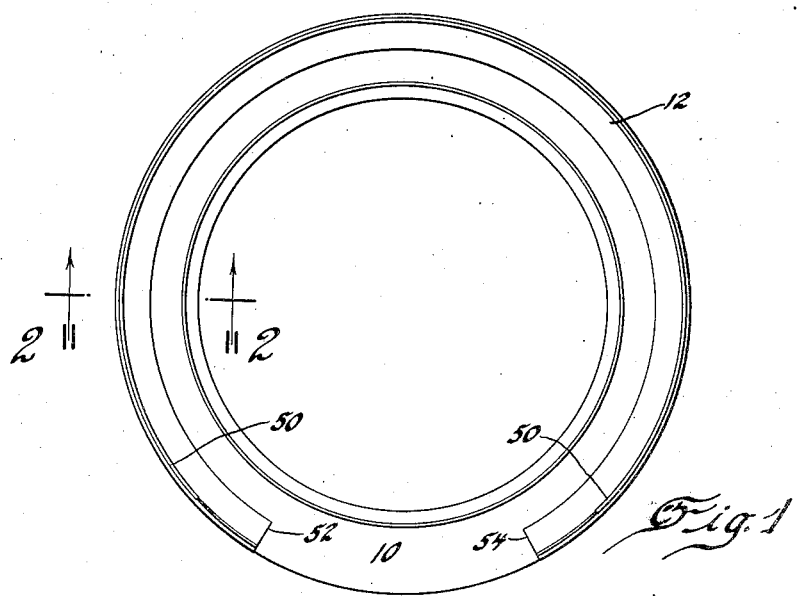

Referring to the drawings, Fig. 1 shows a tire 10 having thereon a cover 12 which includes a face piece 14, a tread piece 16, and a back strip 18. The face piece may be in the form of an annulus, as shown, or it may be in the form of a complete disc, to form a drum type cover. The tread piece and the back piece are of the same length and are somewhat less than a complete circle of 360 degrees in length, for purposes which are fully described in the copending application, above mentioned.

If desired, the cover may be provided with a rear face piece 20, separate from the cover 12, and held in place against the tire by the cover itself.

At the line of juncture between the face piece 14 and the tread piece 16, there may be provided a distending or stiffening ring 22, whose purposes are fully described in the prior patent to T. J. McCormick, No. 1,761,735, June 3, 1930.

The construction thus far described forms no part of the present invention, which concerns itself more particularly with trim-molding rings for use with the cover shown. These rings, and their uses will now be described.

The inner peripheral edge of the face piece 14 is doubled over a wire cord or rope 24 of hemp, etc. and stitched on line 26, to form a beaded edge. A ring 28 of chrome steel or other polished or unpolished material, more or less C shaped in cross section, is then applied to the beaded edge and secured thereto by the introversion of the walls of the ring and by its circular outline, to form a neat appearing, ornamental, stiffening ring around this edge.

Figure 2:
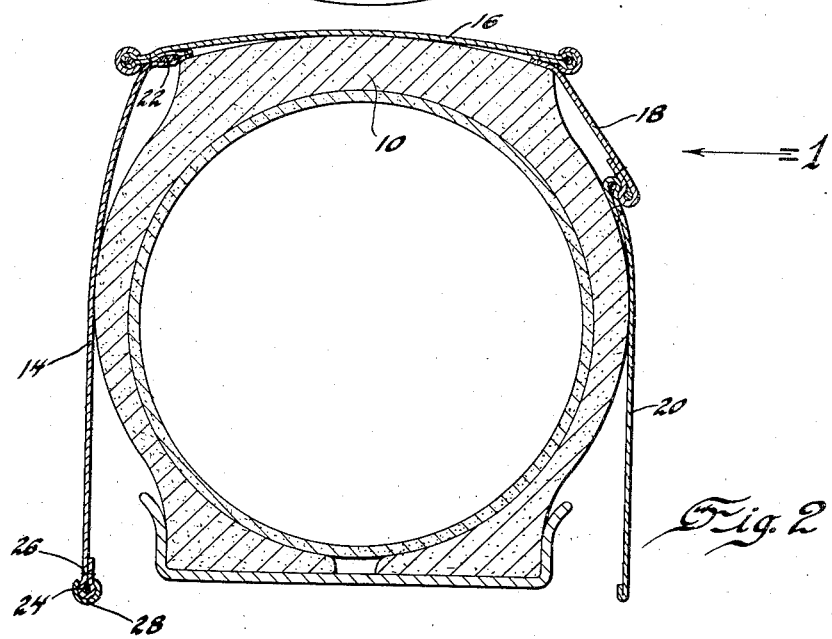
Fig. 2 is a section as if on the line 2—2 of Fig. 1.
Figure 3:
Fig. 3 is an enlarged view of a portion of the cover of Fig. 2.
Figures 7, 8:
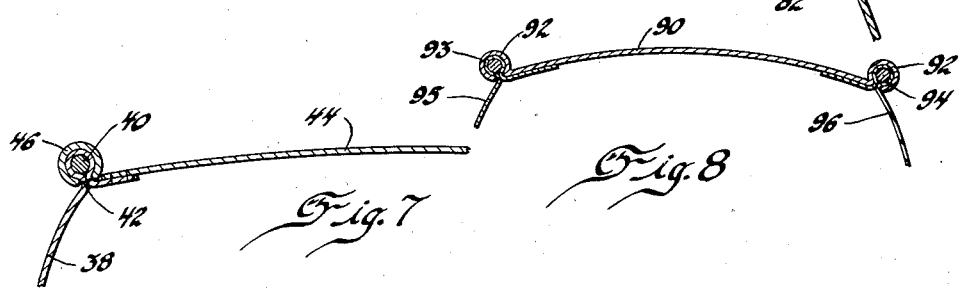

In a similar fashion, the front and rear edges of the tread piece may be provided with trim molding rings. For example, as shown in Figs. 2 and 3, the tread piece 16 is extended over the outer edge of the face piece 14, to provide an edge which is folded over the arcuate cord 30 and stitched at 32. An arcuate ring 34, of the same material and C cross section as the ring 28, is then applied to the beaded edge, the ring 34 securing itself in place and forming an ornamental ring for the edge. If the cover be provided with a flap like that shown at 32 in application Ser. No. 492,966, or if the cover be of the forms of Figs. 5 and 8 of application Ser. No. 492,966, the ring may be 360 degrees in length, but if the cover has a tread piece of less than 360 degrees in length, then the ring will also be less than 360 degrees in length. However, if a gapped tread piece be used and if it be desired that a ring be of a complete circle in length, the ring can be provided on a portion of the face piece. Such a construction is shown in Fig. 7, and in this construction the edge of the face piece 38 is folded over the cord 40 and stitched at 42, the tread piece 44 being joined to the face piece. The ring 46 will then encompass the beaded edge of the face piece, as shown.

Referring again to Fig. 3, it will be seen that this figure shows the tread piece joined to the back piece by a construction like that used for joining the tread piece to the face piece, except that no stiffening ring 22 is employed. Further the ring 50 is less than 360 degrees in length, and in fact, as shown in Fig. 1, is shorter than the back piece. This shortening of the ring 50 is necessary since the back piece and the tread piece must be bent and distorted when the cover is being applied to a tire, near the ends 52—54 (Fig. 1) as described in application Ser. No. 492,966.

The presence of a stiff ring like that at 50, at or near these ends 52, 54, would seriously interfere with the operation of the cover in the manner intended.

Figure 4:

Various modifications of the trim molding ring construction have been disclosed, and these will now be described. In the form of Fig. 4, the stiffening ring (22) of the forms previously described has been omitted, and the ring 60, fastened to the cover at or very near the line of juncture between the tread piece 62 and the face piece 64, is relied upon to stiffen and distend the cover at this point, replacing ring 22. In this form, it is preferred to make the ring 60 completely annular, since it would otherwise not be entirely satisfactory as a stiffening ring.

Figure 5:
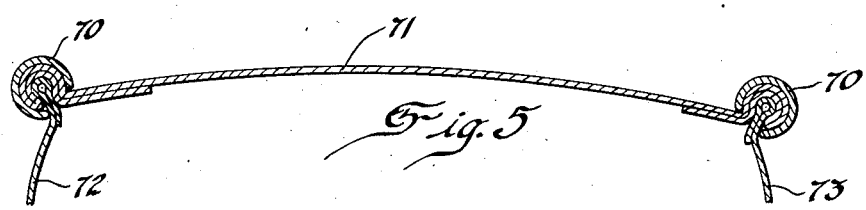

In the form of Fig. 5, the rings 70 and 70, besides serving as trim molding rings, serve also as clamps to effect secure connections between the beaded edges of the tread piece 71 and face pieces 72—73. The rings should be slightly heavier, in thickness, than those previously described, and should be of a more resilient and springy metal. It will also be seen that the stiffening ring 22 has been omitted, its function being absorbed by the distending or stiffening function of the ring 70.

Figure 6:
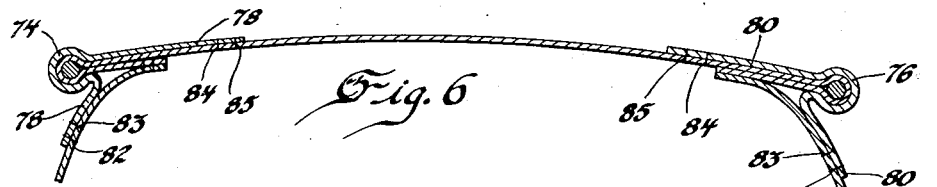

In the form of Fig. 6, the rings 74 and 76 are provided with flanges 78 and 80 which form ornamental bands for the cover. If desired, the fabric portions of the cover may be secured to the bands, so that the rings help to form the junctures between the fabric portions, the lines of stitching being shown at 82—85. Further, the fabric may be cut away and dispensed with between lines 83 and 84, if desired, for purposes of economy.

In the form of Fig. 8, the tread piece is formed by the metal band 90 which has introverted, molding edges 92, encompassing and being clinched around the beads 93 and 94 which form the edges of the fabric face pieces 95 and 96, substantially as shown.

Now having described the invention and the preferred embodiment thereof, it is to be understood that the said invention is to be limited, not to the specific details herein set forth, but only by the scope of the claims which follow.

We claim:

1. A tire cover having face portions, and a tread portion connecting them, and molding members of C cross section and of stiff, smooth, metallic material, disposed on said cover at the lines of juncture between the face portions and the tread portion, one of the face portions being between 180 degrees and 360 degrees in length, the molding member near the last mentioned face portion also being between 180 degrees and 360 degrees in length.

2. A tire cover having face portions, and a tread portion connecting them, and molding members of C cross section and of stiff, smooth, metallic material, disposed on said cover at the lines of juncture between the face portions and the tread portion, one of the face portions being between 180 degrees and 360 degrees in length, the molding member near the last mentioned face portion also being between 180 degrees and 360 degrees in length, but being shorter than the last mentioned face portion.

3. A tire cover having face portions, and a tread portion connecting them, and molding members of C cross section and of stiff, smooth, metallic material, disposed on said cover at the lines of juncture between the face portions and the tread portion, one of the face portions being between 180 degrees and 360 degrees in length, the molding member near the last mentioned face portion also being between 180 degrees and 360 degrees in length, the other face portion and the molding member near the latter being completely annular.

4. A tire cover having face portions and a tread portion connecting them and having beaded edges at the lines of juncture between the face and tread portions, and a molding member of C cross section and of stiff, smooth, metallic material, disposed on said cover at the line of juncture between a face portion and the tread portion and encompassing the beaded edge at said line, the last mentioned face portion being between 180 degrees and 360 degrees in length, the molding member near the last mentioned face portion also being 180 degrees and 360 degrees in length.

5. For use with a tire having an arcuate side wall and a substantially flat tread, a cover made of a pliable material and having a substantially flat side wall and a substantially flat tread wall secured thereto along an outer edge thereof, the line of juncture between these portions being adapted to be spaced from the tire when the cover is mounted thereon, and a C cross section, contraction-resisting, stiff ring of metal or the like secured to and externally encompassing portions of the cover adjacent the line of juncture and serving to protect the line externally, to maintain distended the walls at the line, to space said line away from the tire, and to aid in defining a relatively sharp edge to the cover at that line.

6. A tire cover made of a freely pliable material and having substantially flat tread and side walls joined to each other and meeting in a substantially circular line, and a C cross section contraction-resisting, stiff ring of metal or the like secured to and externally encompassing portions of the cover adjacent the line of juncture between the walls, and serving to distend the walls at the line.

7. A tire cover made of a freely pliable material and having substantially flat tread and side walls joined to each other and meeting in a substantially circular line, and a channelled cross section, contraction-resisting, stiff ring of metal or the like secured to and externally encompassing portions of the cover adjacent the line of juncture between the walls, and serving to distend the walls at the line.

In testimony whereof, we sign this specification.

THOMAS J. McCORMICK.
ROBERT E. LINN.